United States Patent [19]

Niebylski

[11] Patent Number: 5,354,506
[45] Date of Patent: Oct. 11, 1994

[54] PRECERAMIC COMPOSITIONS AND CERAMIC PRODUCTS

[75] Inventor: Leonard M. Niebylski, Birmingham, Mich.

[73] Assignee: Albemarle Corporation, Richmond, Va.

[21] Appl. No.: 413,965

[22] Filed: Sep. 28, 1989

[51] Int. Cl.$^5$ .............. C07K 3/00; C08F 283/12; C04B 35/52
[52] U.S. Cl. ................. 252/387.31; 525/477; 524/437; 501/92
[58] Field of Search .................. 501/88–93; 427/28, 38; 524/424, 431, 439, 440; 528/477; 252/389.31

[56] References Cited

U.S. PATENT DOCUMENTS

| 4,397,828 | 8/1983 | Seyferth et al. | 423/344 |
| 4,645,807 | 2/1987 | Seyferth et al. | 525/474 |
| 4,650,837 | 3/1987 | Seyferth et al. | 525/478 |
| 4,659,850 | 4/1987 | Arai et al. | 556/409 |
| 4,705,837 | 11/1987 | Seyferth et al. | 528/31 |

Primary Examiner—Peter A. Nelson
Attorney, Agent, or Firm—Richard J. Hammond; Patricia J. Hogan

[57] ABSTRACT

Preceramic polymers which have particular utility in providing protective ceramic coatings on carbon/carbon composites, graphite, carbon fibers, and other normally oxidizable materials are prepared by reacting about 0.2–5.0 part by weight of a bis- or tris(dialkylamino)borane with one part by weight of a polysilazane in an organic solvent.

13 Claims, No Drawings

5,354,506

PRECERAMIC COMPOSITIONS AND CERAMIC PRODUCTS

FIELD OF THE INVENTION

This invention relates to ceramic materials derived from polysilazanes and more particularly to such materials which are useful in protecting substrates that are normally susceptible to oxidative deterioration.

BACKGROUND

It is known that many materials, such as carbon/carbon composites, carbon fibers, graphite, and certain metals, have properties which make them attractive for use in aerospace and other applications in which their susceptibility to oxidative deterioration at elevated temperatures is a serious disadvantage. It would be desirable to find a means of protecting those materials from oxidation at high temperatures, and it has been proposed to provide such protection with ceramic coatings. However, known ceramic coatings have proved to be inadequate.

As disclosed in U.S. Pat. No. 4,397,828 (Seyferth et al.-I), U.S. Pat. No. 4,482,669 (Seyferth et al.-II), U.S. Pat. No. 4,645,807 (Seyferth et al.-III), U.S. Pat. No. 4,650,837 (Seyferth et al.-IV), and U.S. Pat. No. 4,659,850 (Arai et al.), it is known that ceramics can be obtained from polysilazanes.

SUMMARY OF THE INVENTION

An object of this invention is to provide novel preceramic polymers.

Another object is to provide such polymers which can be converted to ceramic coatings capable of protecting oxidizable substrates from oxidative deterioration at elevated temperatures.

These and other objects are attained by reacting about 0.2-5.0 parts by weight of a bis- or tris(dialkylamino)borane with one part by weight of a polysilazane.

DETAILED DESCRIPTION

The polysilazane which is reacted with the (dialkylamino)borane may be any polysilazane that is soluble in common organic solvents, such as aliphatic or aromatic hydrocarbons, dialkyl or alicyclic ethers, etc.; and it may be, e.g., a polysilazane of Seyferth et al.-I, Seyferth et al.-II, Seyferth et al.-III, Seyferth et al.-IV, or Arai et al., the teachings of all of which are incorporated herein in toto by reference. However, it is preferably a polysilazane of the type taught by Seyferth et al.-II, i.e., a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, a mixture of such polysilazanes, or, alternatively, an oligomeric ammonolysis product formed as an intermediate in the process of Seyferth et al.-II and isolated as in Seyferth et al.-I. For example, it may be one or more polysilazanes prepared by reacting methyldichlorosilane with ammonia, treating the ammonolysis product with potassium hydride, and quenching the resultant product with methyl iodide or dimethylchlorosilane; or it may be one or more polysilazanes prepared by reacting methyldichlorosilane with ammonia and isolating the ammonolysis product.

The solvent employed for the polysilazane may be any suitable organic solvent, such as hexane, heptane, and other aliphatic hydrocarbons; benzene, toluene, xylene, and other aromatic hydrocarbons; cyclohexanone, 1-methyl-2-pyrrolidone, and other ketones; etc.; and mixtures thereof.

The bis- or tris(dialkylamino)borane which is reacted with the polysilazane is a compound in which the alkyl groups contain 1-6 carbons. Exemplary of such compounds are tris(dimethylamino)borane, tris(diethylamino)borane, tris(dipropylamino)borane, tris(dibutylamino)borane, tris(dipentylamino)borane, tris(dihexylamino)borane, the corresponding bis(dialkylamino)boranes, and mixtures thereof. The preferred compound is tris(dimethylamino)borane. The amount employed is about 0.2-5.0 parts, preferably about 1-5 parts, most preferably about 1-2 parts per part by weight of polysilazane.

Reaction between the (dialkylamino)borane and polysilazane is effected simply by mixing the reactants in the solvent and allowing an exothermic reaction to occur.

The novel polymers of the invention are preceramic polymers which are useful for making ceramics such as coatings, structural composites, etc.; and, like other preceramic materials, they may be used in combination with other ingredients, such as ceramic powders or whiskers, etc., when appropriate.

An application in which they find particular utility is as coating compositions for normally oxidizable materials, especially those which need protection from oxidative deterioration at elevated temperatures. (Such materials include, e.g., fibers, tows, hanks, mats, and composites of carbon; carbon or graphite slabs, rods, and structures; and oxidizable metals, such as magnesium, aluminum, silicon, niobium, molybdenum, lanthanum, hafnium, tantalum, titanium, tungsten, and the metals of the lanthanide and actinide series.) When used in such an application in which the substrate is porous, the compositions can also serve as infiltrants when they are relatively dilute; and infiltration can be prevented or minimized by using more concentrated coating compositions.

In addition to providing protection from oxidative deterioration, the coating compositions can also serve to improve the physical properties and thermal stability of substrates, such as those mentioned above, silica foams, ceramic cloths (e.g., cloths formed from alumina, silica, and/or lithia), etc.

The coating compositions are also useful for patching ceramic coatings formed from the same or different formulations.

When the compositions are to be used to provide protective ceramic coatings on substrates, the surfaces to be coated are usually cleaned prior to the application of the coating composition in order to improve the bonding of the ceramic coating to the substrate. The bonding can sometimes be further improved by pre-etching the surfaces to be coated.

Coating compositions comprising the novel polymers are generally solutions of about 5-75%, preferably about 40-60% by weight of the polymers in organic solvents. These compositions may be applied to the substrates in any suitable manner, such as by spraying, swabbing, or brushing, to form coatings having the desired thickness, generally a thickness of up to about 1000 micrometers, frequently a thickness of about 10–250 micrometers. A coating of a desired thickness can be achieved by applying a single coating of that thickness or by applying the precursor polymer coating composition in multiple thinner layers. For example, when relatively thick coatings are desired, it is preferred to apply the coating composition in layers of about 25–100 micrometers, each layer being dried by driving off the solvent before the next layer is applied.

When temperatures as high as about 200°–250° C. are used to drive off high boiling solvents, some pyrolysis of the preceramic polymer is initiated during the drying of the coating composition. However, higher temperatures, i.e., about 675°–900° C., preferably about 825°–875° C., are required to convert the preceramic coating to a ceramic coating. This pyrolysis may be delayed until the final desired thickness of preceramic coating has been deposited, even when the coating is applied in multiple layers. However, when the coating is applied in multiple layers, it is generally preferred to pyrolyze each one or two layers of dried preceramic coating before applying the next layer of coating composition. The time required for the pyrolysis is generally about 1–60 minutes, depending on the particular pyrolysis temperature selected. In the preferred embodiment of the invention where the coating is applied in multiple layers, each one or two of which is pyrolyzed before the application of the next layer, and the pyrolysis temperature is about 825°–875° C., it is generally preferred to pyrolyze the first coat for only about five minutes and then to pyrolyze subsequent coats for longer times up to about 15 minutes.

After the pyrolysis, the coated substrate is cooled. Optimum results are attained when this cooling is accomplished at a rate not greater than about 50° C./minute, preferably about 20°–30° C./minute, until the substrate temperature is below 500° C., at which time further cooling may be accomplished at ambient air temperature.

Although not essential, it is preferred to keep the starting polysilazanes and the compositions formed from them in a dry atmosphere until a layer of ceramic has been formed because of the susceptibility of the preceramic materials to attack by water and other compounds having active hydrogens.

As already indicated, the polymers of the invention are useful in preparing a variety of ceramic objects, but the major advantage of the invention is its provision of compositions capable of protecting normally oxidizable materials from oxidative deterioration at elevated temperatures. This advantage is of particular importance in the protection of carbon/carbon composites, graphite, and metals used in aerospace applications, such as engine components, advanced nozzle system components, and high-temperature vehicle structures.

The following examples are given to illustrate the invention and are not intended as a limitation thereof.

EXAMPLE I

Synthesis of Polysilazane

Part A

A suitable reaction vessel was charged with 14 L of anhydrous tetrahydrofuran and cooled to about 0° C., after which 1545 g (13.43 mols) of methyldichlorosilane was added to the vessel, and stirring at about 60 rpm was begun. A slow steady stream of 1058 g (62.12 mols) of anhydrous ammonia gas was introduced into the vessel at a flow rate such that the reaction pressure was maintained at or below 400 kPa, and the reaction temperature stayed in the range of 0°–10° C. Then the reaction mixture was stirred at 0° C. for about three hours, after which the coolant flow on the vessel was shut off, and the system was put under gentle nitrogen purge to allow the reaction mass to warm to room temperature and the majority of the excess ammonia to vent off. Then the reaction vessel was pressurized with sufficient nitrogen gas to pump the product mass through a bag filter assembly into a holding tank, where it was verified that the filtrate solution was free of particulates.

Part B

The clear filtrate from Part A was discharged into a polymerization vessel and chilled to about 0° C., and a suspension of 3.6 g (0.089 mol) of potassium hydride powder in about 100 mL of anhydrous tetrahydrofuran was added to begin the polymerization reaction. The reaction mixture was maintained at 0° C. for about 8 hours and then allowed to warm gradually to about 22° C. After a total of about 26 hours of polymerization at 0°–22° C., the reaction was quenched by adding about 12.6 g (0.13 mol) of dimethylchlorosilane to the polymerization solution.

The polymer product was isolated by (1) concentrating the product solution to about 4 L of volume by vacuum distillation, (2) centrifuging the concentrated solution to obtain a clear supernatant solution and a white precipitate, (3) decanting off the supernatant solution from the precipitate, and (4) flashing off the volatiles from the supernatant solution by vacuum distillation to provide a white solid. Proton NMR spectra of the polymer in deuterated chloroform solvent had resonances consistent with those reported in Seyferth et al.-II for polysilazane and with the presence of a small amount, i.e., 2.4% by weight, of residual tetrahydrofuran.

EXAMPLE II

Synthesis of Novel Polymers

Part A

Two grams (2 g) of neat tris(dimethylamino)borane was blended with 5 g of a solution of 40% by weight of the polysilazane of Example I in xylene. An exothermic reaction occurred, and the reaction mixture thickened in minutes to form a viscous solution.

Part B

Two grams (2 g) of neat tris(dimethylamino)borane was blended with 5 g of a solution of 20% by weight of the polysilazane of Example I in xylene. An exothermic reaction occurred, and the reaction mixture thickened in minutes to form a viscous solution.

EXAMPLE III

Part A

Graphite coupons having nominal dimensions of about 3.8 cm×2.5 cm×0.3 cm were abraded to provided a smooth finish, cleaned, vacuum dried, thoroughly swab-coated in an inert atmosphere with the product solution of Example II, Part A, dried, heated at 100° C. for five minutes, heated to 150° C. at a rate of about 10° C./minute, held at 150° C. for 15–30 minutes, allowed to cool to room temperature, recoated and held at 150° C. for 30 minutes, heated to about 200°–225° C., maintained at that temperature for at least 15 minutes, and cooled to provide coupons having a coating thickness of about 0.08–0.1 mm.

The polymer coatings were then pyrolyzed to ceramic coats by heating the coated coupons to 800°–825° C., holding at that temperature for 30 minutes, and cooling to room temperature at a rate of 10°–20° C./minute.

The effectiveness of the ceramic coats thus obtained in protecting the graphite substrate from oxidation was determined by an oxidation test. The coated specimen was mounted horizontally in a half section of a silicon carbide tube which was used as a holder and which allowed over 99% of the coupon surface to be directly exposed to hot ambient convecting air. The holder and specimen were placed in a box furnace which had been preheated to 650° C. Periodically the holder and specimen were removed from the furnace and quenched in ambient air, the cooled specimen was weighed and remounted in its holder, and the holder and specimen were replaced in the heated furnace for additional heating in air. The oxidation weight loss after 8 hours was only 14.6%. This compares with a weight loss of 36–38% when uncoated graphite coupons were subjected to the same test.

Part B

Part a was repeated except that the product solution of Example II, Part, B, was substituted for the product solution of Example II, Part A. The oxidation weight loss after 8 hours was only 2.8–6.9%.

It is obvious that many variations may be made in the products and processes set forth above without departing from the spirit and scope of this invention.

What is claimed is:

1. A process which comprises reacting about 0.2–5.0 parts by weight of a bis- or tris(dialkylamino)borane with one part by weight of a polysilazane.

2. The process of claim 1 wherein the (dialkylamino)borane is tris(dimethylamino)borane.

3. The process of claim 1 wherein the polysilazane is a polymer prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

4. The process of claim 3 wherein the organodihalosilane is methyldichlorosilane and the basic catalyst is potassium hydride.

5. The process of claim 1 wherein about 0.2–5.0 parts by weight of tris(dimethylamino)borane is intimately mixed with a solution containing one part by weight of a polysilazane prepared by reacting methyldichlorosilane with ammonia, treating the ammonolysis product with potassium hydride, and quenching the resultant product with an electrophilic quenching reagent.

6. A preceramic polymer prepared by the process of claim 1.

7. A preceramic polymer prepared by the process of claim 2.

8. A preceramic polymer prepared by the process of claim 3.

9. A preceramic polymer prepared by the process of claim 4.

10. A preceramic polymer prepared by the process of claim 5.

11. A composition which comprises a solution of 5–75% by weight of a preceramic polymer in 95–25% by weight of an organic solvent; the polymer being the product obtained by reacting about 0.2–5.0 parts by weight of a bis- or tris(dialkylamino)borane with one part by weight of a polysilazane.

12. An article which comprises a substrate that is normally susceptible to oxidative deterioration and a coating derived from the composition of claim 11.

13. A ceramic derived from the preceramic polymer of claim 6.

* * * * *